United States Patent Office 3,133,107

Patented May 12, 1964

3,133,107

SEMICARBAZIDE HEXAFLUOROARSENATE

Hugh T. Harrison, Midland, Mich., assignor to The Dow Chemical Company, Midland, Mich., a corporation of Delaware No Drawing. Filed June 4, 1962, Ser. No. 199,625
1 Claim. (Cl. 260—440)

The present invention is directed to the novel salts of semicarbazide and hexafluoroarsenic or hexafluorophosphoric acid. These compounds correspond to the formula $$\mathrm{NH_2{-}\overset{\overset{O}{\|}}{C}{-}NH{-}NH_2\cdot HAsF_6}$$

or $$\mathrm{NH_2{-}\overset{\overset{O}{\|}}{C}{-}NH{-}NH_2\cdot HPF_6}$$

The present compounds are white crystalline materials, of low solubility in organic compounds and of moderate solubility in water. They are useful as parasiticides, and are adapted to be employed in the control of insect, bacterial and fungal pests such as helminths, *Prodenia eridania* (Southern army worm) and *Musca domestica* (house fly).

The novel compounds can be prepared by reacting together semicarbazide and hexafluoroarsenic or hexafluorophosphoric acid. Conveniently, the reaction is carried out in an inert liquid reaction medium, such as water. Good results are obtained when substantially equimolecular proportions of the reactants are employed. The reaction is exothermic and takes place smoothly at temperatures of from 15° to 50° C.

In carrying out the reaction, the semicarbazide is contacted with the hexafluoroarsenic or hexafluorophosphoric acid in any conventional manner. The contacting is conveniently carried out by adding one reactant to the other. Oftentimes it is convenient to employ the hydrate forms of the reagents. The temperatures of the resulting reaction medium can be controlled by regulating the rate of the contacting of the reactants as well as by external cooling. Sometimes the desired product precipitates in the mixture during the reaction. Where desirable to maintain fluid condition such product can be in part separated by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This product can be further purified by conventional procedures such as washing with water or suitable organic liquid and recrystallization.

In a representative operation, about 0.4 mole of semicarbazide monohydrate is dissolved in a small amount of water and is then added slowly portionwise over a period of about twenty minutes and with stirring to an aqueous 65 percent solution of hexafluoroarsenic acid (equivalent to 85.5 grams; 0.45 mole of $HAsF_6$). The aqueous $HAsF_6$ solution employed herein is a commercial product containing 65 percent $HAsF_6$, 21 percent $H_2O$, and 14 percent related arsenic acids. The addition is carried out at room temperature. Upon completion of the addition, the reaction mixture is set aside at room temperature. During this period, the semicarbazide hexafluoroarsenate product precipitates as a white crystalline solid. This product is separated by filtration and successively washed with diethyl ether and ethanol, dried, and found to melt at from 166° to 168° C.

In a similar manner, semicarbazide hexafluorophosphate (as a crystalline material melting at from 219° to 221° C. with decomposition) is prepared by reacting together semicarbazide and hexafluorophosphoric acid.

The present compounds are useful as parasiticides in various insecticidal, nematocidal and antimicrobial compositions. For such use, the unmodified compounds can be employed. However, the present invention also encompasses the use of the compounds together with a parasiticide adjuvant. In such use, the compounds can be dispersed upon a finely divided solid and the resulting preparations employed as dusts. Also, such mixtures can be dispersed in water with the aid of a wetting agent and the resulting aqueous suspension employed as a spray. In other procedures, the products can be employed as constituents of organic liquid compositions, oil-in-water or water-in-oil emulsions or water dispersions with or without the addition of wetting, dispersing or emulsifying agents.

In representative operations, aqueous compositions containing 500 parts by weight of semicarbazide hexafluoroarsenate per million parts of the composition give 100 percent control of Southern army worm.

I claim:

Semicarbazide hexafluoroarsenate.

References Cited in the file of this patent

UNITED STATES PATENTS

| | | |
|---|---|---|
| 1,960,712 | Reimers | May 29, 1934 |
| 2,749,217 | Deutschman | June 5, 1956 |

OTHER REFERENCES

Fluorine Chemistry, edited by J. H. Simons, Academic Press, Inc., New York, New York (1950), pages 138–139.